United States Patent
Fukunaga

(10) Patent No.: US 11,038,392 B2
(45) Date of Patent: Jun. 15, 2021

(54) ELECTRIC MOTOR

(71) Applicant: Nidec Corporation, Kyoto (JP)

(72) Inventor: Keisuke Fukunaga, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 127 days.

(21) Appl. No.: 16/484,129

(22) PCT Filed: Mar. 23, 2018

(86) PCT No.: PCT/JP2018/011724
§ 371 (c)(1),
(2) Date: Aug. 7, 2019

(87) PCT Pub. No.: WO2018/174252
PCT Pub. Date: Sep. 27, 2018

(65) Prior Publication Data
US 2020/0006995 A1   Jan. 2, 2020

(30) Foreign Application Priority Data
Mar. 24, 2017 (DE) .......................... 102017106399.4

(51) Int. Cl.
*H02K 3/28* (2006.01)
*H02K 3/50* (2006.01)

(52) U.S. Cl.
CPC ................. *H02K 3/28* (2013.01); *H02K 3/50* (2013.01); *H02K 2203/09* (2013.01)

(58) Field of Classification Search
CPC ............ H02K 3/28; H02K 3/50; H02K 3/505; H02K 2203/09; H02K 5/22; H02K 5/225
See application file for complete search history.

(56) References Cited

U.S. PATENT DOCUMENTS 6,215,215 B1   4/2001 Huber et al.
7,723,878 B2 *  5/2010 Yagai ..................... H02K 3/522
                                                310/71
(Continued)

FOREIGN PATENT DOCUMENTS

CN   104584396 A   4/2015
CN   105850011 A   8/2016
(Continued)

OTHER PUBLICATIONS

Official Communication issued in corresponding Chinese Patent Application No. 201880026802.6, dated Nov. 20, 2020.
(Continued)

*Primary Examiner* — Robert W Horn
(74) *Attorney, Agent, or Firm* — Keating & Bennett

(57) ABSTRACT

An electric motor includes a housing including a circumferential housing wall centered around a central axis, an annular stator fixedly mounted inside of the housing and including coils to generate a time-varying magnetic field, a busbar unit including a busbar holder and at least one busbar to electrically connect at least one coil of the stator to a power source to energize the at least one coil, and a rotor rotatably mounted inside of the housing to be rotated by an interaction with the magnetic field generated by the stator. The housing wall may include a housing wall engagement structure at an inner surface thereof engaged or configured to be engaged with a busbar unit engagement structure provided on the busbar unit. The housing wall engagement structure may include at least one protrusion defined by a portion of the housing wall dented into the interior of the housing.

13 Claims, 1 Drawing Sheet

(56) References Cited

U.S. PATENT DOCUMENTS

| | | | |
|---|---|---|---|
| 7,737,592 B2* | 6/2010 | Makino | H02K 1/276 310/156.09 |
| 8,018,104 B2* | 9/2011 | Yagai | H02K 3/522 310/71 |
| 8,339,001 B2* | 12/2012 | Ghodsi-Khameneh | H02K 3/28 310/71 |
| 9,000,629 B2* | 4/2015 | Yokogawa | H02K 15/12 310/43 |
| 9,373,985 B2* | 6/2016 | Sugiura | H02K 3/52 |
| 9,438,082 B2* | 9/2016 | Kurono | H02K 3/50 |
| 9,742,234 B2* | 8/2017 | Hashimoto | H02K 3/50 |
| 9,941,760 B2* | 4/2018 | Kayano | H02K 9/19 |
| 10,256,694 B2* | 4/2019 | Fukunaga | H02K 5/16 |
| 10,404,125 B2* | 9/2019 | Nakahara | H02K 3/18 |
| 10,411,542 B2* | 9/2019 | Murakami | H02K 3/50 |
| 10,411,543 B2* | 9/2019 | Makino | H02K 21/24 |
| 10,532,715 B2* | 1/2020 | Jacqmarcq | B60R 21/2037 |
| 10,547,228 B2* | 1/2020 | Kong | B62D 5/0403 |
| 10,715,003 B2* | 7/2020 | Uematsu | F16H 61/0006 |
| 10,756,591 B2* | 8/2020 | Makino | H02K 16/02 |
| 10,873,237 B2* | 12/2020 | Takemoto | H02K 5/15 |
| 2006/0169526 A1* | 8/2006 | Honbo | H02M 7/48 180/444 |
| 2008/0061645 A1 | 3/2008 | Yukitake | |
| 2008/0175732 A1* | 7/2008 | Sakata | H02K 11/33 417/410.1 |
| 2011/0204743 A1 | 8/2011 | Meier et al. | |
| 2013/0015737 A1 | 1/2013 | Helmi | |
| 2015/0145358 A1* | 5/2015 | Cho | H02K 3/522 310/71 |
| 2015/0357878 A1 | 12/2015 | Fukunaga et al. | |
| 2016/0149454 A1 | 5/2016 | Haga et al. | |
| 2016/0301276 A1 | 10/2016 | Saki et al. | |
| 2017/0373563 A1 | 12/2017 | Kim et al. | |
| 2018/0241272 A1* | 8/2018 | Asahi | H02K 3/38 |
| 2019/0379261 A1* | 12/2019 | Kim | G01D 5/2066 |
| 2019/0383303 A1* | 12/2019 | Cho | F04D 13/06 |
| 2020/0006995 A1* | 1/2020 | Fukunaga | H02K 3/50 |
| 2020/0195083 A1* | 6/2020 | Ueno | H02K 3/522 |
| 2020/0220416 A1* | 7/2020 | Fischer | H01R 25/165 |
| 2020/0244141 A1* | 7/2020 | Sambuichi | H02K 5/225 |
| 2020/0295609 A1* | 9/2020 | Park | H02K 21/22 |
| 2020/0309127 A1* | 10/2020 | Koike | F04C 23/008 |

FOREIGN PATENT DOCUMENTS

| | | |
|---|---|---|
| DE | 10 2014 110 073 A1 | 1/2016 |
| DE | 10 2014 221 872 A1 | 4/2016 |
| WO | 2013/154054 A1 | 10/2013 |
| WO | 2016/111539 A1 | 7/2016 |

OTHER PUBLICATIONS

Official Communication issued in International Patent Application No. PCT/JP2018/011724, dated Jun. 26, 2018.

* cited by examiner

[Fig. 1]
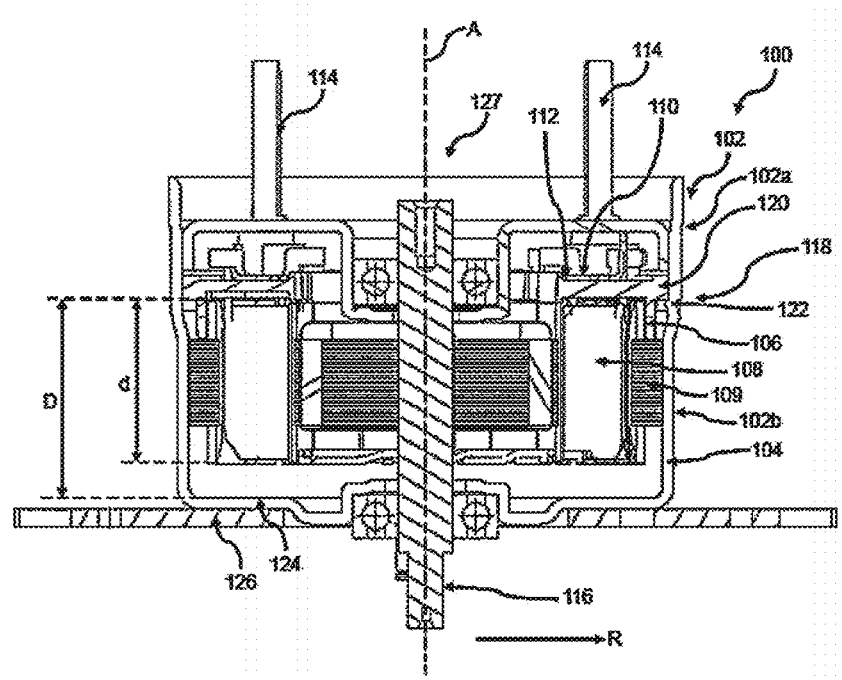
[Fig. 2]
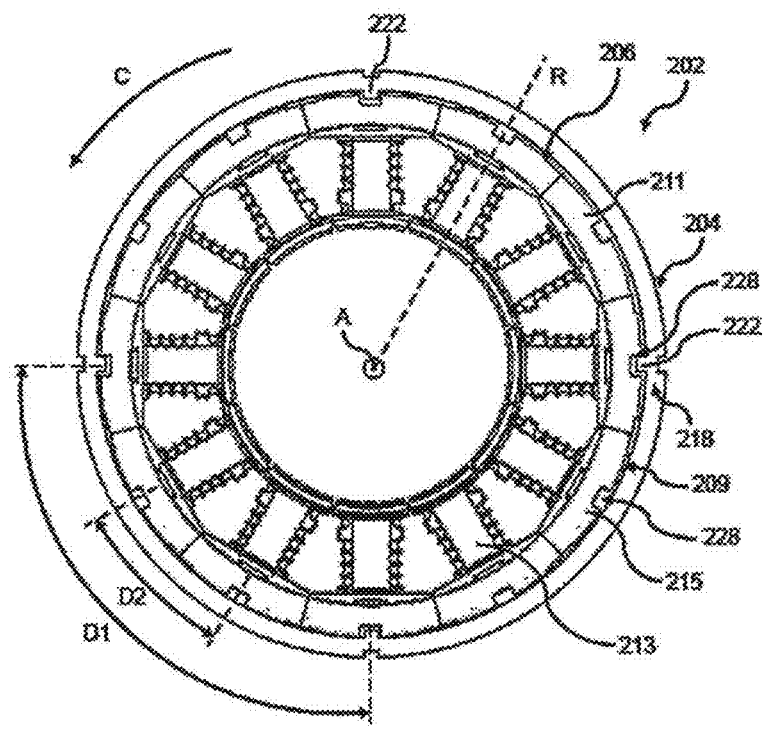

ELECTRIC MOTOR

CROSS REFERENCE TO RELATED APPLICATIONS

This is the U.S. national stage of PCT Application No. PCT/JP2018/011724, filed on Mar. 23, 2018, and priority under 35 U.S.C. § 119(a) and 35 U.S.C. § 365(b) is claimed from German Application No. 102017106399.4, filed Mar. 24, 2017; the entire disclosures of each application are hereby incorporated herein by reference.

1. FIELD OF THE INVENTION

Various example embodiments relate generally to an electric motor.

2. BACKGROUND

Electric motors have become essential parts in a large variety of driving systems employed, e.g., in mobile environments such as in vehicles. The operation of electric motors is usually controlled by an electronic control circuit electrically connected to the electric motor via a busbar unit including at least one busbar fixedly coupled to a holder of the busbar unit and electrically connected to at least one coil of a stator of the electric motor.

Normally, the busbar unit is fixedly coupled to the stator, and the stator is fixedly mounted inside of a housing of the electric motor. Hence, the position of the stator inside the housing of the electric motor defines the position of the busbar unit and of the at least one busbar relative to the housing of the electric motor.

In order to ensure a well-defined electric contact of the at least one busbar with an electronic control unit configured to control the power supply to the at least one busbar, the at least one busbar has to have a well-defined position with respect to the housing of the electric motor. However, the outer dimensions of conventional stators suffer from high tolerances, in particular due to the winding wires of their coils, and, hence, cannot be arranged in a well-defined position within the housing of an electric motor. Therefore, a busbar of a busbar unit coupled to a conventional stator cannot be positioned in a well-defined position with respect to the housing of an electric motor. As a result, the electric contact between a busbar of a busbar unit and an electronic control unit cannot be accurately adjusted. In this way, the coils of a stator cannot be supplied with a well-defined electric power which in turn may deteriorate the performance of a respective electric motor.

SUMMARY

According to various example embodiments of the present disclosure, electric motors are provided. An electric motor according to an example embodiment of the present disclosure includes a housing including a circumferential housing wall centered around a central axis, an annular stator fixedly mounted inside of the housing and including a plurality of coils to generate a time-varying magnetic field, a busbar unit including a busbar holder and at least one busbar to electrically connect at least one coil of the stator to a power source to energize the at least one coil, and a rotor rotatably mounted inside of the stator to be rotated by an interaction with the magnetic field generated by the stator. The housing wall includes a housing wall engagement structure at an inner surface thereof engaged or configured to be engaged with a busbar unit engagement structure provided on the busbar unit. The housing wall engagement structure includes at least one protrusion defined by a portion of the housing wall dented into the interior of the housing.

The above and other elements, features, steps, characteristics and advantages of the present disclosure will become more apparent from the following detailed description of the example embodiments with reference to the attached drawings.

BRIEF DESCRIPTION OF DRAWINGS

FIG. 1 shows a cross-sectional view of an electric motor.
FIG. 2 shows a plan view of a stator mounted in the interior of a modified housing.

DETAILED DESCRIPTION

The following detailed description refers to the accompanying drawings that show, by way of illustration, specific details and example embodiments in which the disclosure may be practiced.

The word "exemplary" is used herein to mean "serving as an example, instance, or illustration". Any example embodiment or design described herein as "exemplary" is not necessarily to be construed as preferred or advantageous over other example embodiments or designs.

In FIG. 1, an exemplary electric motor 100 is shown. The electric motor 100 includes: a housing 102 including a circumferential housing wall 104 centered around a central axis A, an annular stator 106 fixedly mounted inside of the housing 102 and including a plurality of coils 108 respectively wound around a stator core 109 and configured to generate a time-varying magnetic field, a busbar unit 110 including a busbar holder 112 and at least one busbar 114 configured to electrically connect at least one coil 108 of the stator 106 to a power source (not shown) to energize the at least one coil 108, and a rotor 116 rotatably mounted inside of the housing 102 and configured to be rotated by an interaction with the magnetic field generated by the stator 106. The stator core 109 may include or may be formed of a ferromagnetic material such as ferromagnetic steel. As indicated in FIG. 1, an axial portion of the rotor 116 may be surrounded by the stator 106. At least the axial portion of the rotor 116 surrounded by the stator 106 may be at least temporarily magnetized in order to enable a magnetic interaction with the time-varying magnetic field generated by the coils 108 of the stator 106 in order to rotate the stator 116.

The electric motor 100 may be employed, e.g., in an electric pump (not shown) configured to convey a liquid such as a service liquid in a vehicle, e.g., lubricating oil or a coolant.

The housing wall 104 includes a housing wall engagement structure 118 at an inner surface thereof engaged or configured to be engaged with a busbar unit engagement structure 120 provided on the busbar unit 110. The housing wall engagement structure 118 includes at least one protrusion 122, or optionally a plurality of protrusions 122, configured as a portion or as portions of the housing wall 104 dented into the interior of the housing 102.

By means of the housing wall engagement structure 118 and of the busbar unit engagement structure 120, the busbar unit 110 itself may be coupled to the housing wall 104. Therefore, the axial position of the busbar unit 110 in the housing 102 of the electric motor 100 may be set irrespectively of tolerances of the outer dimensions of the stator 106.

In this way, a well-defined electric contact between the at least one busbar 114 and an electronic control circuit or a power source can be established which in turn enables the coils 108 of the stator 106 to be supplied with a well-defined electric power.

In order to ensure that tolerances of the axial extension d of the stator 106 does not influence the engagement between the busbar unit engagement structure 120 and the housing wall engagement structure 118, the axial extension d of the stator 106 may be set to a value that is smaller than the distance D between the at least one protrusion 122 and an inner surface 124 of an axial end wall 126 of the housing 102 delimiting the housing 102 in the axial direction A. The axial extension d of the stator 106 may be smaller than 90%, optionally smaller than 80%, further optionally smaller than 70%, of the distance D between the at least one protrusion 122 and the inner surface 124 of the axial end wall 126 of the housing 102.

As indicated in FIG. 1, the housing 102 may include a first housing portion 102a adjacent to an open end 127 of the housing 102 and a second housing portion 102b adjacent to the axial end wall 126 of the housing 102. As further shown in FIG. 1, the first housing portion 102a may have a larger diameter, i.e. a larger extension in a radial direction R than the second housing portion 102b. The housing wall engagement structure 118 may be provided on the first housing portion 102a. The housing wall engagement structure 118 may be configured with such radial dimensions that it does not protrude beyond the radially inner surface of the second housing portion 102b.

As indicated in FIG. 1, the stator core 109 may be provided with radial dimensions smaller than the inner radial dimensions of the second housing portion 102b. In this way, the stator core 109 may be easily inserted into the second housing portion 102b without being obstructed by the housing wall engagement structure 118. In an example embodiment, the stator core 109 may be fixed to the radially inner surface of the second housing portion 102b, e.g. by gluing or any other suitable fixing means.

The coils 108 may be grouped into a plurality of phase groups, e.g., into three phase groups U, V, W, that respectively include a plurality of coils 108 electrically connected in series with each other. In association with each of the phase groups, at least one busbar 114 may be provided to respectively connect the coils 108 of the phase groups with a power source.

The at least one protrusion 122 may be formed by caulking, i.e. that the at least one protrusion 122 may be provided as an integral part of the housing wall 104, meaning that no additional parts need to be provided therefor. In this way, the housing wall engagement structure 118 may be manufactured in a simple way.

The busbar unit engagement structure 120 may be provided on the busbar holder 112, either as a separate member attached to the busbar holder 112, or configured as an outer circumferential part of the busbar holder 112, e.g., as an integral part thereof. The busbar unit engagement structure 120 may include or may be configured as at least one holder recess configured to receive a protrusion 122 of the housing wall engagement structure 118 therein. By means of a configuration of this kind, the busbar unit 110 may be kept in a well-defined position also in the circumferential direction C by means of the busbar unit engagement structure 120 engaged with the housing wall engagement structure 118.

The above configuration of the housing 102 with the first and second housing portions 102a, 102b having mutually different radial extensions or diameter is not mandatory. In an alternative example embodiment, the housing may be provided with a uniform inner diameter over its entire axial length and the stator core may be configured to be passed by the housing wall engagement structure. This will be subsequently explained on the basis of FIG. 2. In FIG. 2, the same reference numerals will be used for the same elements as in FIG. 1, however, enhanced by the number 100.

FIG. 2 is a schematic plan view of a stator 206 mounted in a slightly modified housing 202. For convenience, no busbar unit and rotor are shown in FIG. 2.

As shown in FIG. 2, the housing wall engagement structure 218 may include a plurality of protrusions 222 separately formed from each other and arranged one after the other in the circumferential direction C of the housing wall 204. By means of the plurality of protrusions 222, a busbar unit can be supported at a plurality of positions in the circumferential direction C. In this way, the entire circumference of a busbar unit can be held in a well-defined axial position. The protrusions 222 of the plurality of protrusions 222 may have the same distance D from an inner surface of an axial end wall of the housing 202.

In the turning position of the stator 206 with respect to the central axis A relative to the housing wall 204 shown in FIG. 2, the radially outer dimensions of the stator 206 are smaller than the corresponding radially inner dimensions of the housing wall 204 in the axial portion of the housing wall 204 including the plurality of protrusions 222. By means of this configuration, the stator 206 may be passed by the protrusions 222 in order to engage a busbar unit engagement structure with the housing wall engagement structure 218. In the turning position of the stator 206 shown in FIG. 2, the stator 206 may be inserted from an open end of the housing 202 similar to the open end 127 shown in FIG. 1 into the housing 202 without being impeded by the protrusions 222.

As shown in FIG. 2, the stator 206 may include at least one radially outer recess 228 continuously formed in the axial direction A. The dimensions of the at least one radially outer recess 228 in the radial and circumferential directions are larger than the corresponding dimensions of the at least one protrusion 222 in the radial and circumferential directions, respectively. In this way, it is made sure that the stator 206 can be passed by the protrusions 222 provided on the housing wall 204 when the at least one recess 228 is aligned with the at least one protrusion 222.

As shown in FIG. 2, the stator 206 may include a plurality of the radially outer recesses 228 arranged one after the other in the circumferential direction C. The recesses 228 may be positioned at regular intervals in the circumferential direction C. In an example embodiment, the protrusions 222 may also be positioned at regular intervals in the circumferential direction C.

The distance D1 between the centers in the circumferential direction C of two immediately adjacent protrusions 222 may be equal to or may be an integer multiple of the distance D2 between the centers in the circumferential direction C of two immediately adjacent recesses 228. By means of this configuration, it is made sure that when one recess 228 is aligned with a protrusion 222, all the other recesses 228 are also aligned with respective protrusions 222 in case the recesses 228 and the protrusions 222 are respectively positioned at regular intervals in the circumferential direction C. Consequently, a plurality of turning positions of the stator 206 with respect to the housing wall 204 in view of the central axis A exist in which the stator 206 may be passed by the protrusions 222. Hence, the insertion of the stator 206 into the housing 202 may be performed in a simple way.

As shown in FIG. 2, the stator 206 may also include a stator core 209 around which a plurality of coils are to be wound. For convenience, no coils are shown in FIG. 2. The stator core 209 include or may be made of a ferromagnetic material such as of ferromagnetic steel.

The stator core 209 may include a plurality of core segments 211 arranged one after the other in the circumferential direction C of the stator 206. Each core segment 213 may include a coil winding portion 213 around which respective coils are to be wound. The coil winding portions 213 may be configured as elongated members extending in the radial direction R of the stator 206. Each core segment 211 may further include a core segment flange portion 215 positioned at a radially outer end of the coil winding portion 213. The core segment flange portions 215 may serve as means for defining the radially outer position of the coils.

Two immediately adjacent core segments 211 in the circumferential direction C may be fixedly connected to each other by means of their core segment flange portions 215, e.g., by welding, soldering, or by any other suitable fixing means. In this way, it can be ensured that the coil winding portions 213 of two adjacent core segments 211 have a well-defined mutual distance for accommodating respective coils wound around the respective coil winding portions 213. As shown in FIG. 2, the plurality of recesses 228 may be provided in a plurality of the core segment flange portions 215.

In the following, several examples of the present disclosure will be described.

Example 1 is an electric motor. The electric motor may include: a housing including a circumferential housing wall centered around a central axis, an annular stator fixedly mounted inside of the housing and including a plurality of coils configured to generate a time-varying magnetic field, a busbar unit including a busbar holder and at least one busbar configured to electrically connect at least one coil of the stator to a power source to energize the at least one coil, and a rotor rotatably mounted inside of the housing, e.g., of the stator, and configured to be rotated by an interaction with the magnetic field generated by the stator. The housing wall may include a housing wall engagement structure at an inner surface thereof engaged or configured to be engaged with a busbar unit engagement structure provided on the busbar unit. The housing wall engagement structure may include at least one protrusion configured as a portion of the housing wall dented into the interior of the housing.

In Example 2, the subject matter of Example 1 can optionally further include that at least one protrusion is formed by caulking.

In Example 3, the subject matter of any one of Examples 1 or can optionally further include that the housing wall engagement structure includes a plurality of the protrusions. The protrusions may be formed separately from each other and arranged one after the other in the circumferential direction.

In Example 4, the subject matter of any one of Examples 1 to 3 can optionally further include that the outer dimensions of the stator are in at least one turning position, optionally in a plurality of turning positions, further optionally in each turning 5 position, with respect to the central axis relative to the housing wall smaller than the inner dimensions of the housing wall in an axial portion including the at least one protrusion.

In Example 5, the subject matter of Example 4 can optionally further include that the stator includes at least one radially outer recess continuously formed in the axial direction. The dimensions of the at least one radially outer recess in the radial and circumferential directions may be larger than the dimensions of the at least one protrusion in the radial and circumferential directions, respectively.

In Example 6, the subject matter of Examples 3 and 5 can optionally further include that the stator includes a plurality of the radially outer recesses arranged one after the other in the circumferential direction. The distance between the centers in the circumferential direction of two immediately adjacent protrusions may be equal to or may be an integer multiple of the distance between the centers in the circumferential direction of two immediately adjacent recesses.

In Example 7, the subject matter of any one of Examples 1 to 6 can optionally further include that the stator includes a stator core around which the plurality of coils are wound.

In Example 8, the subject matter of Example 7 can optionally further include that the stator core includes a plurality of core segments arranged one after the other in the circumferential direction of the stator. The core segments may respectively include a coil winding portion around which the coils are respectively wound.

In Example 9, the subject matter of Example 8 can optionally further include that each core segment further includes a core segment flange portion positioned at a radially outer end of the coil winding portion. Two immediately adjacent core segments may be fixedly connected to each other by means of their core segment flange portions.

In Example 10, the subject matter of Example 6 and of any one of Examples 7 to 9 can optionally further include that the plurality of recesses are provided in an outer circumferential portion of the stator core.

In Example 11, the subject matter of Examples 9 and 10 can optionally further include that the plurality of recesses are respectively provided in a plurality of the core segment flange portions.

In Example 12, the subject matter of any one of Examples 1 to can optionally further include that the busbar unit engagement structure is provided on the busbar holder.

In Example 13, the subject matter of Example 12 can optionally further include that the busbar unit engagement structure is configured as an outer circumferential part of the busbar holder.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. An electric motor, comprising:
a housing including a circumferential housing wall centered around a central axis;
an annular stator fixedly mounted inside of the housing and including a plurality of coils to generate a time-varying magnetic field;
a busbar unit including a busbar holder and at least one busbar to electrically connect at least one coil of the stator to a power source to energize the at least one coil; and
a rotor rotatably mounted inside of the stator to be rotated by an interaction with the magnetic field generated by the stator; wherein
the housing wall includes a housing wall engagement structure at an inner surface thereof engaged or configured to be engaged with a busbar unit engagement structure provided on the busbar unit;

the housing wall engagement structure includes at least one protrusion defined by a portion of the housing wall dented into an interior of the housing.

2. The electric motor of claim 1, wherein at least one protrusion is defined by caulk.

3. The electric motor of claim 1, wherein the housing wall engagement structure includes a plurality of the protrusions that are separate structures from each other and arranged one after the other in the circumferential direction.

4. The electric motor of claim 1, wherein outer dimensions of the stator are in at least one turning position with respect to the central axis relative to the housing wall smaller than inner dimensions of the housing wall in an axial portion including the at least one protrusion.

5. The electric motor of claim 4, wherein the stator includes at least one radially outer recess continuously provided in the axial direction, wherein dimensions of the at least one radially outer recess in the radial and circumferential directions are larger than dimensions of the at least one protrusion in the radial and circumferential directions, respectively.

6. The electric motor of claim 5, wherein the stator includes a plurality of the radially outer recesses arranged one after the other in the circumferential direction;

a distance between centers in the circumferential direction of two immediately adjacent protrusions is equal to or is an integer multiple of a distance between centers in the circumferential direction of two immediately adjacent recesses.

7. The electric motor of claim 1, wherein the stator includes a stator core around which the plurality of coils are wound.

8. The electric motor of claim 7, wherein the stator core includes a plurality of core segments arranged one after the other in the circumferential direction of the stator; and the core segments respectively include a coil winding portion around which the coils are respectively wound.

9. The electric motor of claim 8, wherein each core segment further includes a core segment flange portion positioned at a radially outer end of the coil winding portion; and two immediately adjacent core segments are fixedly connected to each other by the respective core segment flange portions.

10. The electric motor of claim 8, wherein the plurality of recesses are provided in an outer circumferential portion of the stator core.

11. The electric motor of claim 9, wherein the plurality of recesses are respectively provided in a plurality of the core segment flange portions.

12. The electric motor of claim 1, wherein the busbar unit engagement structure is provided on the busbar holder.

13. The electric motor of claim 12, wherein the busbar unit engagement structure is an outer circumferential portion of the busbar holder.

* * * * *